(12) United States Patent
Yu et al.

(10) Patent No.: US 7,523,299 B2
(45) Date of Patent: Apr. 21, 2009

(54) METHOD AND SYSTEM FOR MODIFYING OPERATION OF ROM BASED BOOT CODE OF A NETWORK ADAPTER CHIP

(75) Inventors: Kelly Yu, Irvine, CA (US); Takashi Tomita, Laguna Niguel, CA (US); Jonathan F. Lee, Dublin, CA (US)

(73) Assignee: Broadcom Corporation, Irvine, CA (US)

( * ) Notice: Subject to any disclaimer, the term of this patent is extended or adjusted under 35 U.S.C. 154(b) by 501 days.

(21) Appl. No.: 11/273,237

(22) Filed: Nov. 14, 2005

(65) Prior Publication Data

US 2007/0028083 A1 Feb. 1, 2007

Related U.S. Application Data

(60) Provisional application No. 60/703,773, filed on Jul. 29, 2005.

(51) Int. Cl.
*G06F 15/177* (2006.01)
(52) U.S. Cl. .......................................... 713/2; 717/168
(58) Field of Classification Search ................ 713/2, 713/1; 717/168
See application file for complete search history.

(56) References Cited

U.S. PATENT DOCUMENTS

| | | | | | |
|---|---|---|---|---|---|
| 5,901,225 | A | * | 5/1999 | Ireton et al. | 714/7 |
| 7,194,502 | B1 | * | 3/2007 | Gavlik et al. | 709/200 |
| 2003/0196096 | A1 | * | 10/2003 | Sutton | 713/181 |

* cited by examiner

*Primary Examiner*—Thomas Lee
*Assistant Examiner*—Albert Wang
(74) *Attorney, Agent, or Firm*—McAndrews, Held & Malloy, Ltd.

(57) ABSTRACT

Certain embodiments for modifying operation of ROM based boot code may include modifying a bootup sequence for boot code resident in a ROM within a network adapter chip (NAC). The bootup sequence may be modified during booting of the NAC using code patches in memory external to the NAC. The boot code may comprise ROM loader code and/or self-boot code in the ROM within the NAC. Execution of the self-boot code may comprise execution of code patches. The code patches may comprise initialization code patches and service code patches. The code patches may be executed in place of functions in the self-boot code or in addition to the functions in the self-boot code. Additionally, the code patches may be configured such that a function in the self-boot code may be effectively deleted where no corresponding code patch may be executed in place of the function.

32 Claims, 10 Drawing Sheets

| Offset | | | | | | |
|---|---|---|---|---|---|---|
| 0x00 | Signature 280a | Format 280b | Rsvd 280c | MAC address 280d | | |
| 0x04 | MAC address 280d | | | | | |
| 0x08 | Rsvd 280e | | | | | |
| 0x0c | Rsvd 280e | | | Configuration 280f | | |
| 0x10 | Checksum 280g | Rsvd 280h | S | I | Rsvd 280i | |
| 0x14 | Data Block 280k | | | | | |
| ... | | | | | | |

| Patch number 366a | Patch Length 366b | O 366c | T 366d |
|---|---|---|---|
| 31  27 26    15  11 10 | 18 2 | 17 1 | 16 0 |

| Checksum 450 | Reserved 452 | Patch Count 454 | Image Length 456 | Rsvd 458 |
|---|---|---|---|---|
| | (0x0) | (0x5) | (0x13) – 19 words; 76 bytes | (0x0) |
| 1st Code Patch Descriptor - 460 | | | 2nd Code Patch Descriptor - 462 | |
| 460a | 460b | 460c ---- 460d | 462a | 462b | 462c ---- 462d |
| 0x0 | 0x5 | 0x0       0x1 | 0x3 | 0x2 | 0x1       0x0 |
| 3rd Code Patch Descriptor - 464 | | | 4th Code Patch Descriptor - 466 | |
| 464a | 464b | 464c ---- 464d | 466a | 466b | 466c ---- 466d |
| 0x5 | 0x0 | 0x1       0x0 | 0xa | 0xb | 0x1       0x1 |
| 5th Code Patch Descriptor - 468 | | | Padding 470 | |
| 468a | 468b | 468c ---- 468d | | 0x0 | |
| 0xd | 0x1 | 0x0       0x0 | | | |
| 1st code patch 472 - Patch 0 | | | | |
| 2nd code patch 474 - Patch 3 | | | | |
| 4th code patch 476 - Patch 10 | | | | |
| 5th code patch 478 - Patch 13 | | | | |

METHOD AND SYSTEM FOR MODIFYING OPERATION OF ROM BASED BOOT CODE OF A NETWORK ADAPTER CHIP

CROSS-REFERENCE TO RELATED APPLICATIONS/INCORPORATION BY REFERENCE

This application makes reference to, claims priority to, and claims benefit of U.S. Provisional Application Ser. No. 60/703,773 filed Jul. 29, 2005.

This application also makes reference to:
U.S. patent application Ser. No. 11/273,280 filed Nov. 14, 2005; and
U.S. patent application Ser. No. 11/273,281 filed Nov. 14, 2005.

Each of the above stated applications is hereby incorporated herein by reference in its entirety.

FIELD OF THE INVENTION

Certain embodiments of the invention relate to network devices. More specifically, certain embodiments of the invention relate to a method and system for modifying operation of ROM based boot code.

BACKGROUND OF THE INVENTION

High-speed digital communication networks over copper and optical fiber are used in many network communication and digital storage applications. Ethernet and Fiber Channel are two widely used communication protocols, and the protocols continue to evolve in response to increasing demand for higher bandwidth in digital communication systems.

The Ethernet protocol may provide collision detection and carrier sensing in the physical layer of the OSI protocol model. The physical layer, layer 1, is responsible for handling all electrical, optical, opto-electrical, and mechanical requirements for interfacing to the communication media. Notably, the physical layer may facilitate the transfer of electrical signals representing an information bitstream. The physical layer may also provide services such as, for example, encoding, decoding, synchronization, clock data recovery, and transmission and reception of bit streams. Gigabit Ethernet (GbE), which initially found application in gigabit servers, is becoming widespread in personal computers, laptops, and switches, thereby providing the necessary infrastructure for handling data traffic for PCs and servers.

As the demand for higher data rates and bandwidth continues to increase, equipment vendors are employing new design techniques for manufacturing network layer 1 equipment capable of handling these increased data rates. However, the equipment vendors are also trying to limit cost rise associated with the newer equipment, if not reduce the cost, with respect to the previous generation of equipment. Reduction of chips and/or the size of chips, and reduction of printed circuit board (PCB) real estate may help reduce cost.

Traditionally, network equipment vendors have used memory external to a processor in which to store boot code for the processor. The external memory, which may be at least one memory chip, may incur further expenses to the manufacturer in addition to a cost of the memory chip. For example, the additional cost may be due to the additional printed circuit board real estate required for the chip, and/or the increased complexity for layout of the signal traces from the memory chip to the processor, and other chips to which the memory chip may be coupled.

Some network devices, for example, may have boot code stored in a ROM section of an on-chip processor. Sometimes there may be bugs in the code that resides in the ROM. Whenever this happens, the Rom portion of the processor may have to be re-masked, and the processor replaced. This may be a costly process, especially in cases where the network devices are widely distributed and/or deployed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for modifying operation of ROM based boot code, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for modifying operation of ROM based boot code. Aspects of the method may comprise modifying a bootup sequence for boot code resident in a ROM within a network adapter chip (NAC) during booting of the NAC using code patch in memory external to the NAC. The boot code may comprise ROM loader code and/or self-boot code in the ROM within the NAC.

Figure 1:
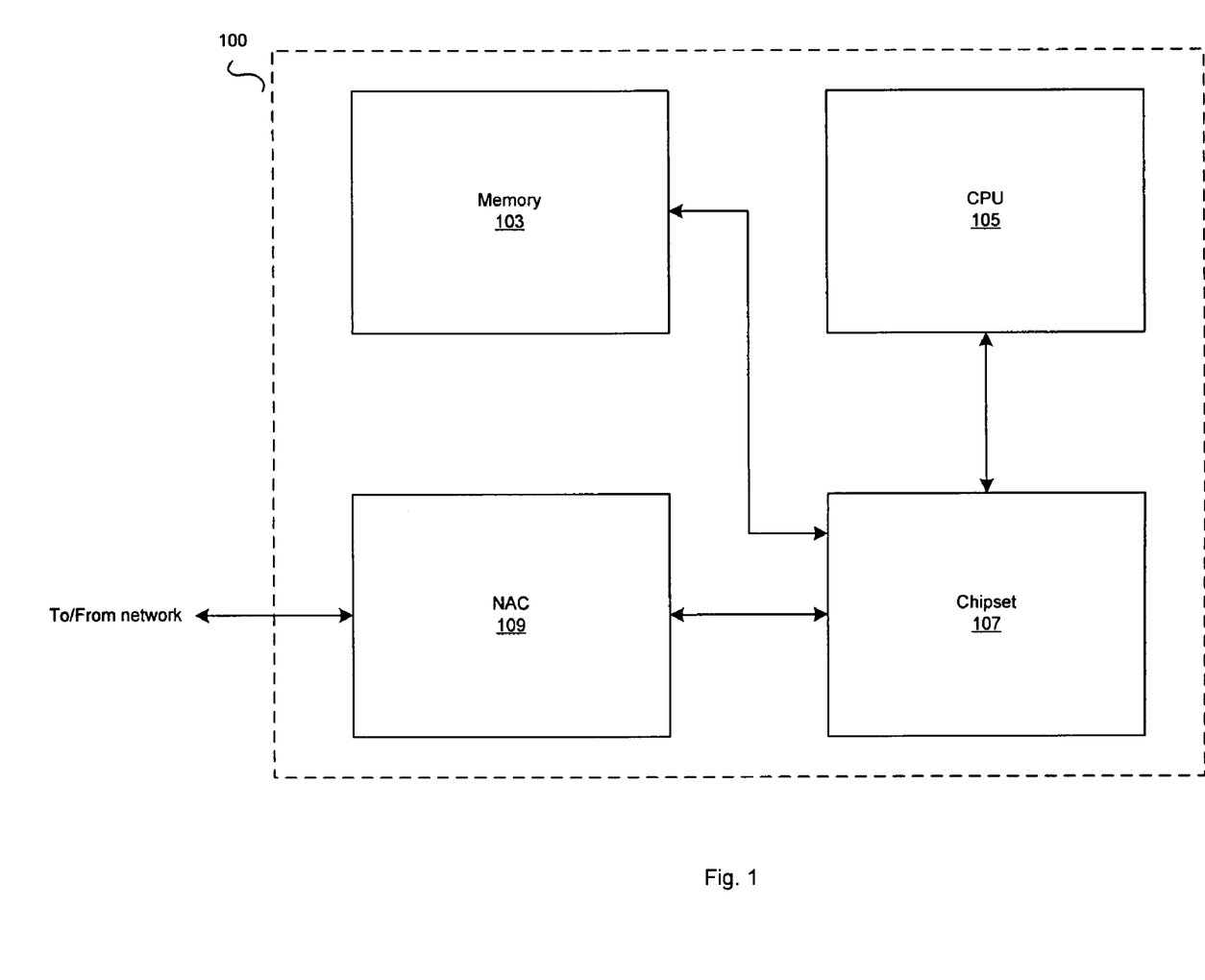
FIG. 1 is a block diagram illustrating an exemplary network interface system, which may be utilized in connection with an embodiment of the invention.

FIG. 1 is a block diagram illustrating an exemplary network interface system, which may be utilized in connection with an embodiment of the invention. Referring to FIG. 1, there is shown a laptop 100 comprising exemplary components such as a memory block 103, a CPU 105, a chipset 107, and a network adapter chip (NAC) 109. The CPU 105 may communicate with the memory block 103 and the chipset 107, and the chipset 107 may communicate with the NAC 109. The NAC 109 may be physically connected to a network, such as, for example, an Ethernet network, via a cable. In this manner, the NAC 109 may transmit data to the network and receive data from the network.

The memory block 103 may comprise suitable logic, circuitry, and/or code that may be adapted to store a plurality of control, status, and/or data information. The information stored in memory block 103 may be accessed by other processing blocks, for example, the CPU 105.

The CPU 105 may comprise suitable logic, circuitry, and/or code that may be adapted to process data that may be read from, for example, the memory block 103. The CPU 105 may store data in the memory block 103, and/or communicate data, status, and/or commands with other devices in the laptop 100, for example, the chipset 107 and/or the NAC 109.

The chipset 107 may comprise suitable logic, circuitry, and/or code that may be adapted to manage input/output data such as voice and/or data traffic from the CPU to the memory block 103 and/or peripheral devices, for example, the NAC 109.

The NAC 109 may comprise suitable logic, circuitry, and/or code that may be adapted to physically interface to the network, for example, the Ethernet network, via a cable. Accordingly, the laptop 100 may send and receive data to and from the Ethernet network.

In operation, the CPU 105 may communicate data to the NAC 109 for transmission to a network destination. Data may be received from a network source, for example, an external computer that may also be on the network, and the NAC 109 may indicate to the CPU 105 the availability of the received data. The CPU 105 may then process the data and/or save the data in the memory block 103.

Figure 2A:
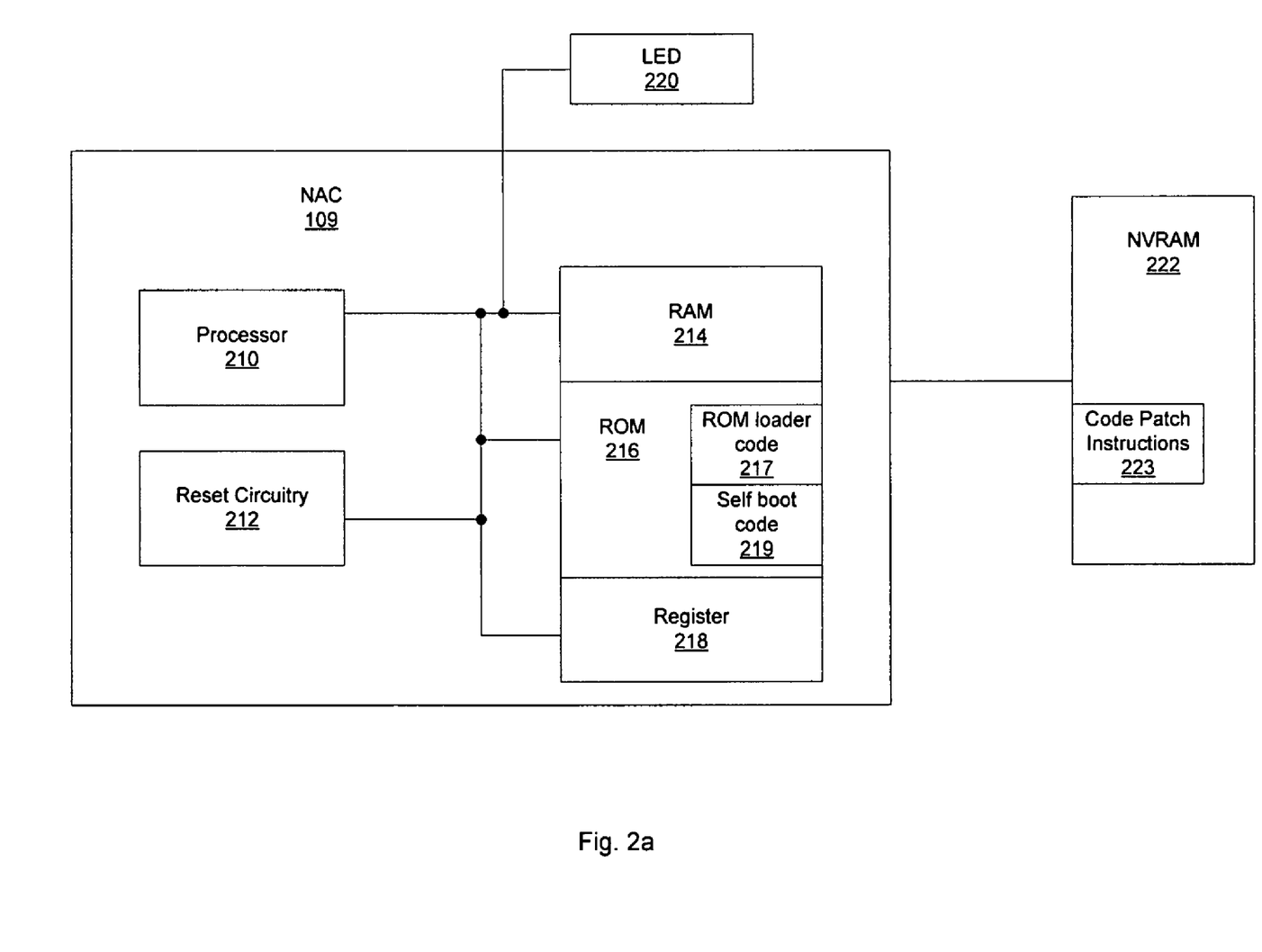
FIG. 2a is a block diagram of an exemplary network adapter chip comprising on-chip ROM loader code and a self-boot code, in accordance with an embodiment of the invention.

FIG. 2a is a block diagram of an exemplary network adapter chip comprising on-chip ROM loader code and on-chip self-boot code, in accordance with an embodiment of the invention. Referring to FIG. 2a, there is shown the NAC 109, an LED 220, and a NVRAM 222. The NAC 109 that may comprise a processor 210, reset circuitry 212, RAM 214, ROM 216, and a register block 218. The register block may be hardware registers and/or a portion of the RAM 214. The NVRAM 222 may be, for example, an EEPROM or FLASH memory.

The reset circuitry 212 may comprise suitable logic and/or circuitry that may be adapted to generate a reset signal to the processor 210 during power-up. The processor 210 may use ROM loader code 217 and the self-boot code 219 that may be stored in the ROM 216, and instructions in a code patch block 223 in the NVRAM 222 to boot the NAC 109. After a successful boot, the processor 210 may be involved in transmitting data to a network, or receiving data from the network. The processor 210 may use the RAM 214 to temporarily store data, for example, which is to be transmitted to the network, or, which has been received from the network. Information in the NVRAM 222 may be used during the boot and/or after the boot. The register block 218 may be used to hold data. The LED 220 may be used to indicate, for example, an error in a boot process by either turning on the LED 220 steadily or by blinking the LED 220. The U.S. application Ser. No. 11/273,280, filed on even date herewith, provides a detailed description of the boot process, and is hereby incorporated herein by reference in its entirety.

Figure 2B:
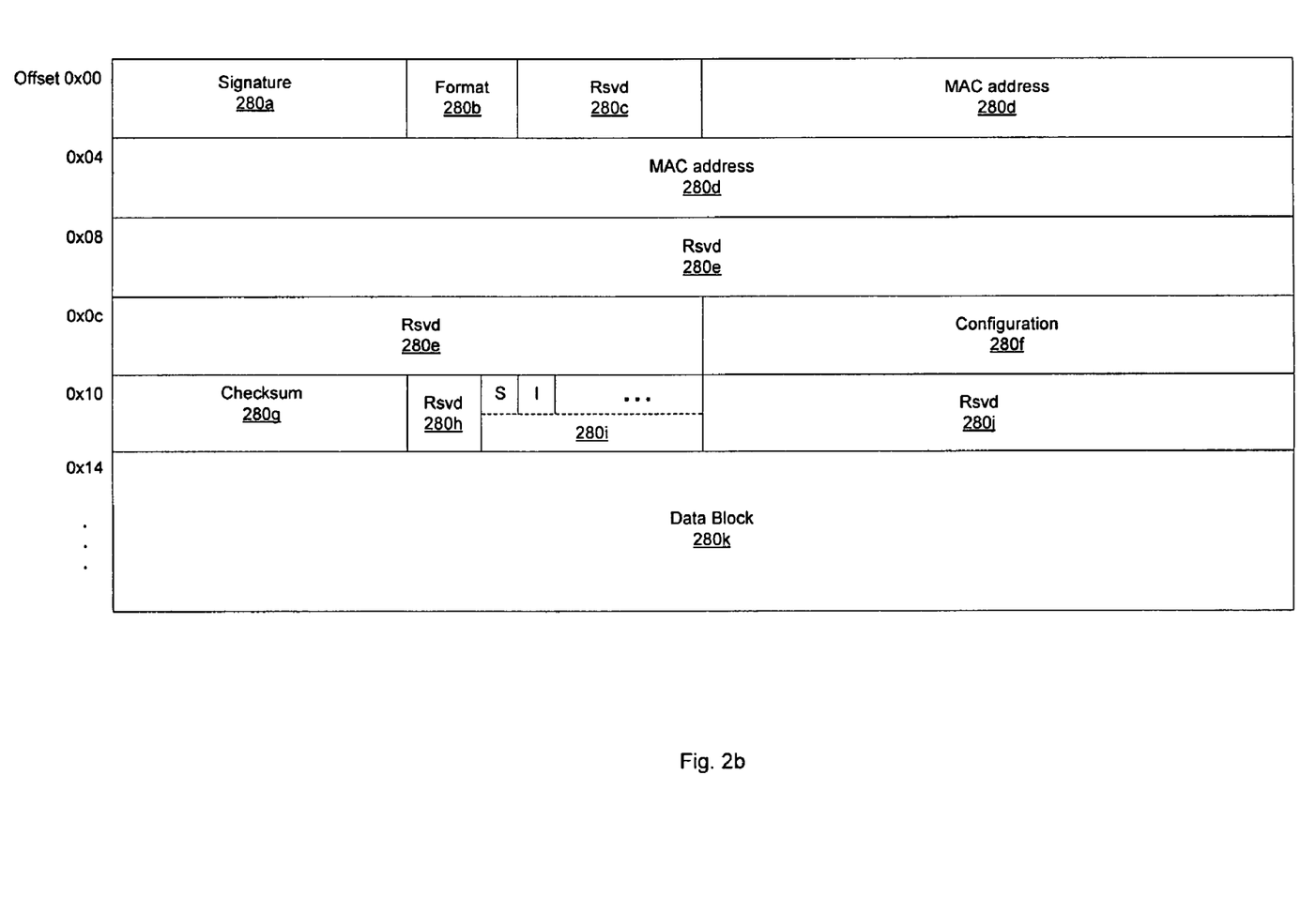
FIG. 2b is an exemplary memory map format 1 for a NVRAM that may be used for code patches, in accordance with an embodiment of the invention.

FIG. 2b is an exemplary memory map format 1 for a NVRAM that may be used for code patches, in accordance with an embodiment of the invention. Referring to FIG. 2b, there is shown a plurality of data fields in first five words of the NVRAM 222. There is shown a signature field 280a, a format field 280b, reserved fields 280c, 280e, 280h, and 280j, a MAC address field 280d, a configuration field 280f, a checksum field 280g, a 6-bit flag field 280i, and a data block 280k. The 6-bit flag field 280i may comprise a SCP flag S and an ICP flag. The remaining four bits may be used for other purposes, for example, that may relate to power supplied to the NAC 109. The size of the data block 280k may be as large as the size of the NVRAM 222 minus the first five bytes of the memory map format 1. Any bits in the reserved fields 280c, 280e, 280h, and 280j or unused bits may be set to, for example, zero.

Other memory map formats may be utilized without departing from the spirit of the invention. In this regard, although specific fields may have been disclosed, the invention need not be so limited. For example, in other embodiments of the invention, the format 1 memory map may specify a different number of bytes, and the fields described may have different number of bits, and/or the fields may be at different positions. Additionally, other fields may be added and/or described fields may be removed.

In accordance with an exemplary embodiment of the invention, the signature field 280a may identify the type of NVRAM. For example, a NVRAM that supports self-boot code 219 may have a particular bit pattern, for example, 0xa5. This may indicate that the NVRAM may have supplementary code and/or information in, for example, code patch block 223. The code patch block 223 may comprise at least one code patch that may be used to modify boot functionality of the self-boot code 219. The code patch block 223 may be in native MIPS machine language or in instructions from a patch code instruction (PCI) set. Header information for each code patch may indicate whether the code patch comprises PCI format instructions or MIPS instructions. A code patch written in PCI format instructions may be decoded during the boot process. The U.S. application Ser. No. 11/273,281, filed on even date herewith, provides a detailed description of the PCI format instructions and its usage, and is hereby incorporated herein by reference in its entirety.

If the code patch cannot be decoded during the boot process, a code patch execution error may be indicated. The error may be indicated, for example, by asserting bit 13 of the memory location 0xc10 in the RAM 214. The instruction that cannot be decoded may be ignored without causing, for example, an interrupt, exception, error handling, or halting of the processor 210. Accordingly, the error may be indicated so that the processor 210 may, at a later time, read the memory location 0xc10. The processor 210 may, at that time, store information that an error occurred while decoding a code patch. This information may be used to troubleshoot or debug instructions in the code patch block 223 and/or decoding instructions in the self-boot code 219. In an exemplary embodiment of the invention, each code patch may be an initialization code patch (ICP) or a service code patch (SCP). Other types of code patches may also be provided.

The format field 280b may specify a type of self-boot NVRAM memory map format. For example, two exemplary NVRAM memory map formats may be format 0 and format 1. One exemplary embodiment of the invention may support up to eight formats with the present 3-bit format field 280b.

Other embodiments of the invention may comprise N bits in the format field 280b, thus allowing up to $2^N$ number of formats. The MAC address field 280d may contain a MAC address. The MAC address may be a unique hardware address that may identify a network node. For example, the NAC 109 may be a network node, and the MAC address may be the address associated with the NAC 109.

The configuration field 280f may comprise information that may be utilized to determine how the NAC 109 may be configured. For example, whether the NAC 109 may be enabled or disabled, or the speed at which the NAC 109 may be used. For example, an Ethernet network may support 10 Mbps, 100 Mbps, 1 Gbps, and/or 10 Gbps data transfer rate, or even higher transfer rates. Checksum for the checksum field 280g may be generated by an algorithm that may, for example, add each byte of the first five words, and then perform a two's complement of the sum of the bytes. The value of the checksum field 280g may initially be zero for the purpose of generating the checksum. The generated checksum may be stored in the checksum field 280g in the fifth block. The checksum may be generated and stored at the appropriate location as part of compilation of source code and image creation for the NVRAM 222.

During execution of the ROM self-boot code 219, a checksum verification may add all bytes of the first five words, including the checksum. The resulting sum may be zero if there are no bit errors in the first five words. A non-zero result for the checksum verification may result in execution of an error routine that may retry the checksum verification. After a number of checksum verification failures, a system error may be generated that may result, for example, in ignoring data in the NVRAM 222. The response to checksum verification failure may be design and/or implementation dependent. For example, the CPU 105 may be interrupted after a checksum failure. Or, a flag may be asserted in a register or a memory location indicating a checksum failure.

The SCP flag S in the flag field 280i may be asserted if service code patch (SCP) is present in the data block. Otherwise, the SCP flag S may be deasserted. The ICP flag I in the flag field 280i may be asserted if initialization code patch (ICP) is present in the data block. Otherwise, the ICP flag I may be deasserted.

The data block 280k may comprise a plurality of data sub-blocks that may comprise the coach patch block 223 that may comprise ICP and SCP blocks. The ICP and SCP blocks may comprise initialization code patches (ICP) and the service code patches (SCP). The ICP and SCP may be instructions that may be executed in place of, or in addition to, various functions in the ROM boot code.

Figure 3A:
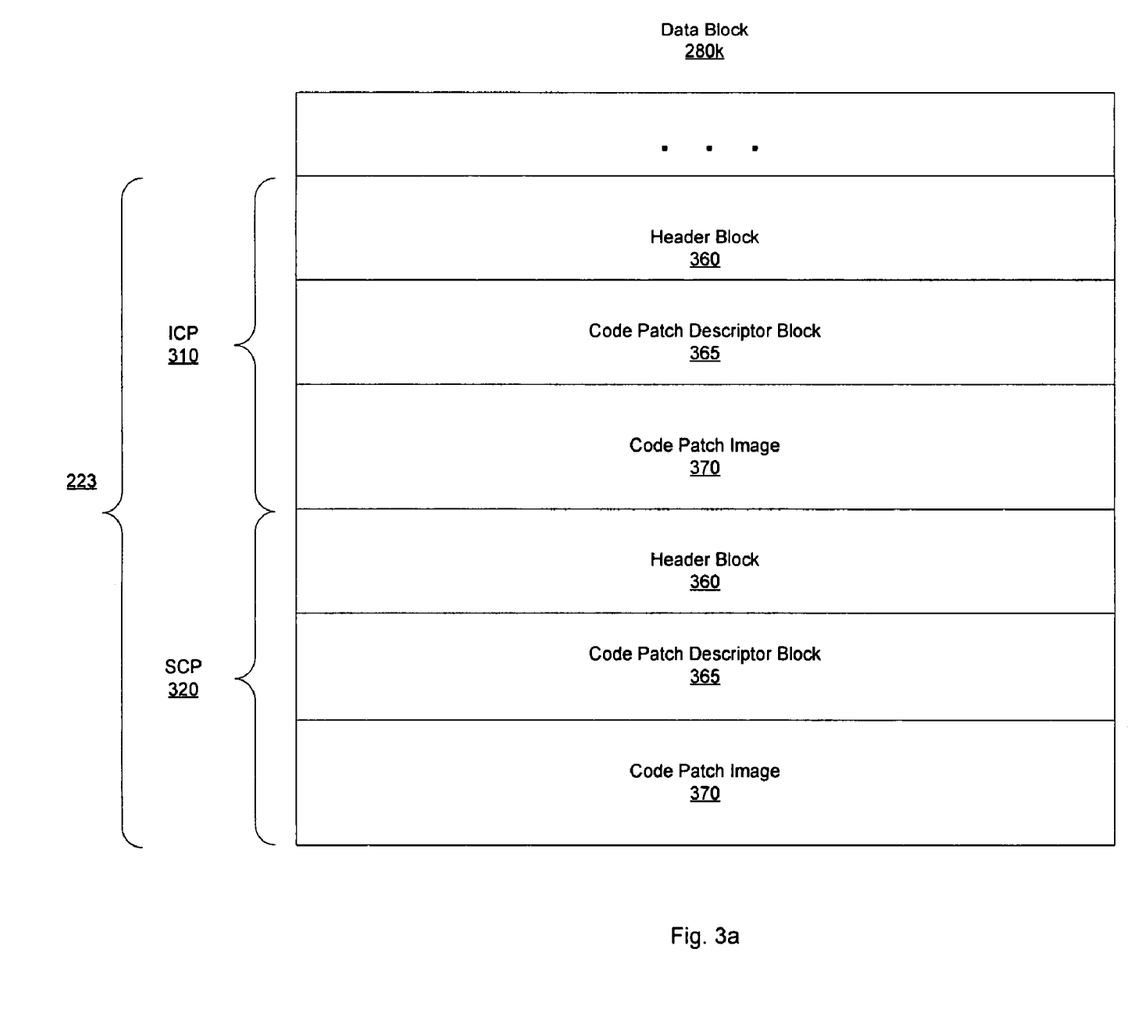
FIG. 3a is an exemplary diagram of the code patch block within the data block, in accordance with an embodiment of the invention.

FIG. 3a is an exemplary diagram of the code patch block within the data block, in accordance with an embodiment of the invention. Referring to FIG. 3a, there is shown the code patch block 223 that may comprise an ICP block 310 and a SCP block 320. The ICP block 310 and the SCP block 320 may each comprise a header block 360, a code patch descriptor block 365, and a code patch image block 370.

The header block 360 for the ICP block 310 or the SCP block 320 may comprise information about the number of code patches in the ICP block 310 or the SCP block 320. The header block 360 may also comprise information about the size of the corresponding code patch image block 370. The code patch descriptor block 365 may comprise a code patch descriptor for each code patch in the code patch image block 370. Even though each code patch descriptor may be 16 bits in size, the code patch descriptor block 365 may start and end on a 32-bit boundary. Accordingly, if there is an odd number of code patch descriptors, there may be a 16-bit padding that may be set to, for example, zeros. The code patch image block 370 may comprise at least one code patch, where each code patch may correspond to at least one function in the self-boot code 219. The code patch in the code patch image block 370 may be executed in place of the corresponding function in the self-boot code 219, or in addition to, the corresponding function in the self-boot code 219.

The self-boot code 219 may use the header information in the header block 360 to load the code patch image block 370 from the NVRAM 222 to a beginning address of a portion of a RAM, for example, the RAM 214. This may occur, for example, during the initialization of the ICP and the SCP. If the ICP and the SCP are both copied, the ICP code patch image block 370 may be copied first and the SCP code patch image block 370 may be copied after the ICP code patch image block 370. The code patch image block 370 for the ICP and/or the SCP may be copied to a particular address of the RAM 214, such as, for example, 0x10000, during the ICP and SCP initialization, respectively. Initialization of the ICP and the SCP may also comprise copying portions of the header block 360 and code patch descriptors 366 . . . 369 in the code patch descriptor block 365 in order to access the specific code patches in the code patch image blocks 370.

The ICP block 310 may comprise at least one code patch that initializes, for example, the NAC 109. The service code in the self-boot code 219, which may execute after a boot phase, may execute in a loop. Accordingly, the patches for the SCP may be executed multiple times. The SCP block 320 may comprise, for example, a code patch that initiates power down of the NAC 109 and/or a code patch that initiates power down of specific circuitry in the NAC 109. The functionality that may be supported by the ICP block 310 and the SCP block 320 may be design and/or implementation dependent.

Figure 3B:
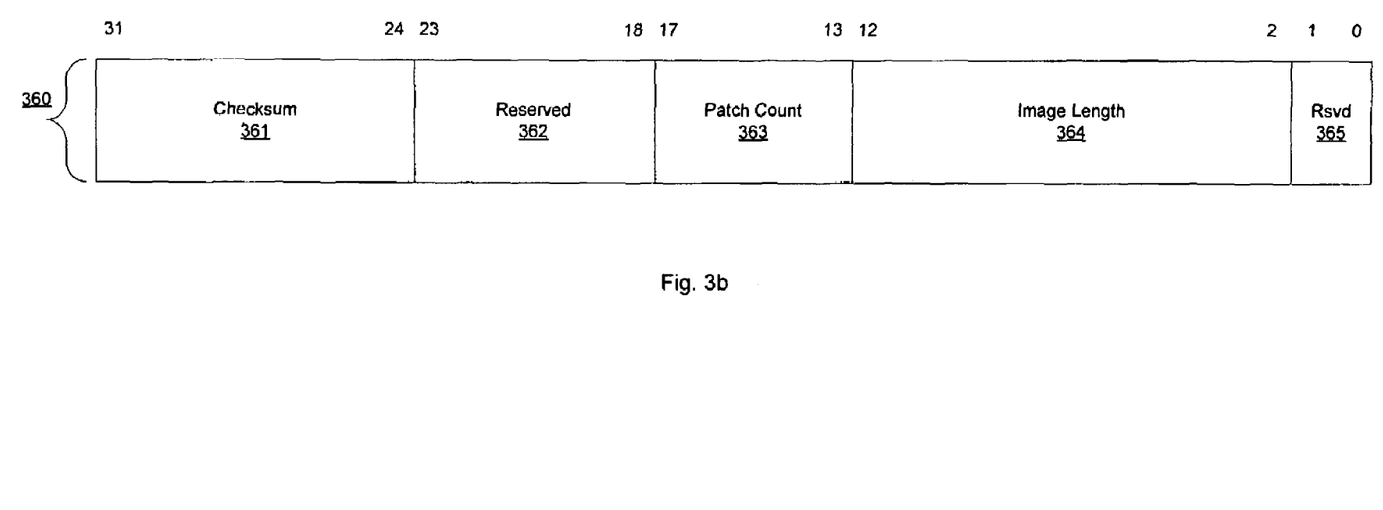
FIG. 3b is an exemplary diagram of a header block, in accordance with an embodiment of the invention.

FIG. 3b is an exemplary diagram of a header block, in accordance with an embodiment of the invention. Referring to FIG. 3b, there is shown a header block 360 that comprises a checksum field 361, reserved fields 362 and 365, a patch count field 363, and an image length field 364. The reserved fields 362 and 365 may set all bits in the fields to, for example, zeros. An exemplary embodiment of the invention may assign 8 bits for the checksum field 361, 5 bits for the patch count field 363, and 11 bits for the image length field 364. Accordingly, there may be up to 32 code patches and $2^{11}$, or 2048, words in the corresponding code patch image block 370. Each word may comprise 32 bits of data. However, the invention need not be so limited. For example, the number of bits assigned to each field may be changed, and the total number of bits in the header may also be changed. The header length and field sizes may be design dependent.

Checksum for the checksum field 361 for each ICP block 310 and the SCP block 320 may be generated by an algorithm that may, for example, add each byte of the corresponding header block 360, the corresponding code patch descriptor block 365, and the corresponding code patch image block 370, and then performing a two's complement of the sum of the bytes. The value of the checksum field 361 may initially be zero for the purpose of generating the checksum. The generated checksum may be stored in the checksum field 361. The checksum may be generated and stored at the appropriate location as part of compilation of source code and image creation for the NVRAM 222.

During the self-booting process, ICP and SCP initialization may occur. Checksum verification may occur during the ICP and SCP initialization where all bytes of the ICP and the SCP, respectively, including the checksum, may be added together. The resulting sum should be zero if there are no bit errors in the ICP block 310 and the SCP block 320, respectively. A non-zero result for the checksum verification may result in execution of an error routine that may retry the checksum verification and/or copying the ICP. After a predetermined number of checksum verification failures, a system error may be generated that may result, for example, in the ICP block 310 and/or the SCP block 320 not being utilized. The particular response to checksum verification failure may be design and/or implementation dependent. For example, the CPU 105 may be interrupted after a checksum failure. Or, a flag may be asserted in a register or a memory location indicating an ICP and/or SCP checksum failure.

The patch count may be a value that may indicate the number of code patches that may be in the corresponding ICP block 310 or the SCP block 320. Each code patch in the ICP block 310 or the SCP block 320 may replace or supplement a corresponding function in the self-boot code 219. Accordingly, the code patches in the ICP block 310 and the SCP block 320 may be executed rather than, or in addition to, the corresponding functions in the self-boot code 219. For example, only the code patch may be executed, thereby allowing new functionality to replace the functionality of the corresponding function in the self-boot code 219. In another embodiment of the invention, a null code patch may be provided that does nothing, and, therefore, the corresponding function in the self-boot code 219 may be skipped. This may effectively remove functionality related to the corresponding function in the self-boot code 219. Alternatively, the code patch and the corresponding function in the self-boot code 219 may be executed, thereby allowing additional functionality in the code patch to be added to the corresponding self-boot code 219.

The image length field 364 may comprise a value that may indicate the number of words in the corresponding ICP block 310 or the SCP block 320. The image length may be used to copy a correct number of bytes of the ICP image and/or the SCP image from, for example, the NVRAM 222 to the RAM 214. The ICP and/or the SCP images may be copied to the RAM 214 during boot up prior to executing the code patches.

Figure 3C:
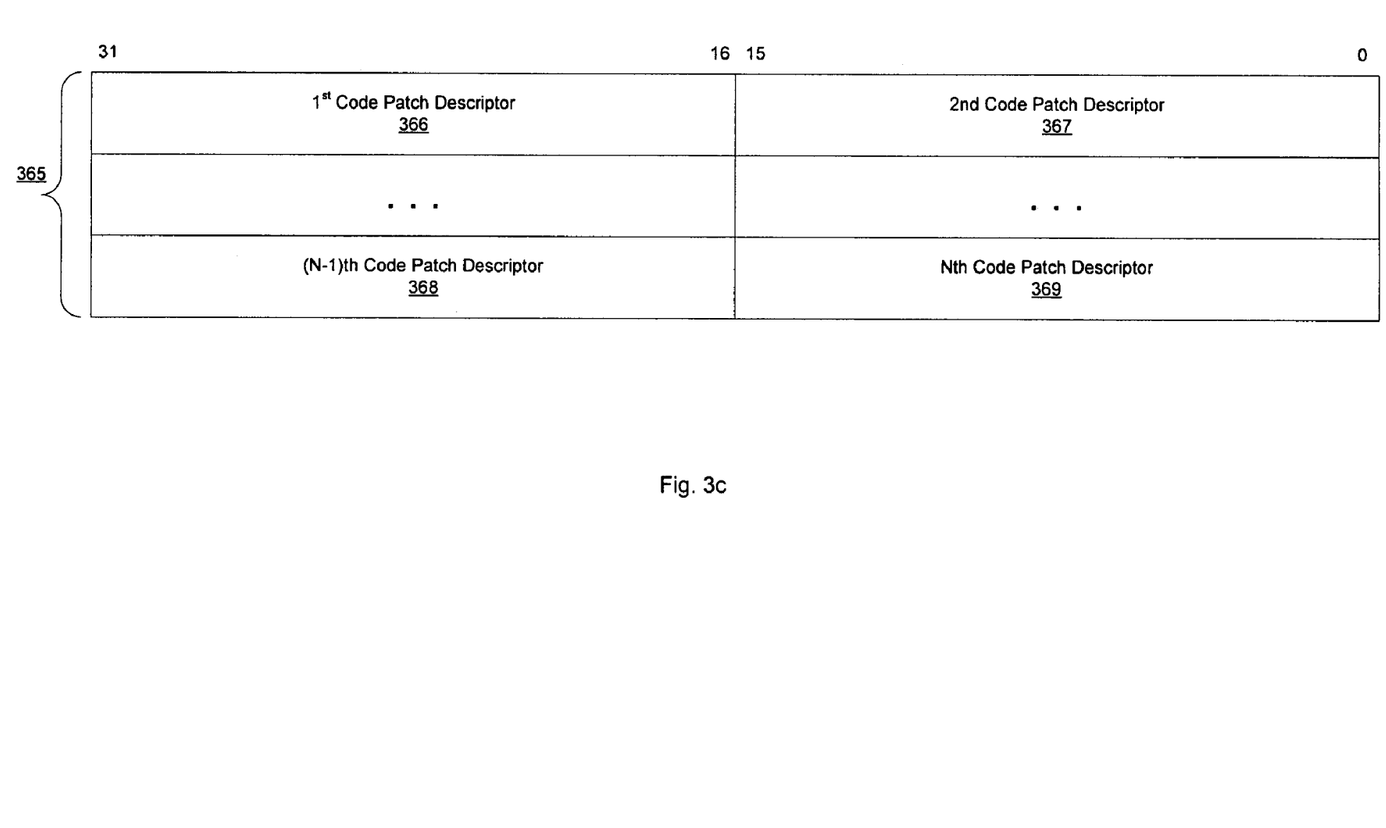
FIG. 3c is an exemplary diagram of a code patch descriptor block, in accordance with an embodiment of the invention.

FIG. 3c is an exemplary diagram of a code patch descriptor block, in accordance with an embodiment of the invention. Referring to FIG. 3c, the code patch descriptor block 365 may comprise a plurality of, for example, 16-bit fields that may comprise information related to a corresponding code patch in the code patch image block 370. A 32-bit word may comprise two code patch descriptors, which may be stored, for example, in big-endian format. In this regard, the least significant code patch descriptor may comprise bits 31:16 and the most significant code patch descriptor may comprise bits 15:0. However, the invention need not be so limited. For example, the code patch descriptors may be stored in little-endian format. Accordingly, the least significant code patch descriptor may comprise bits 15:0 and the most significant code patch descriptor may comprise bits 31:16.

Figure 3D:
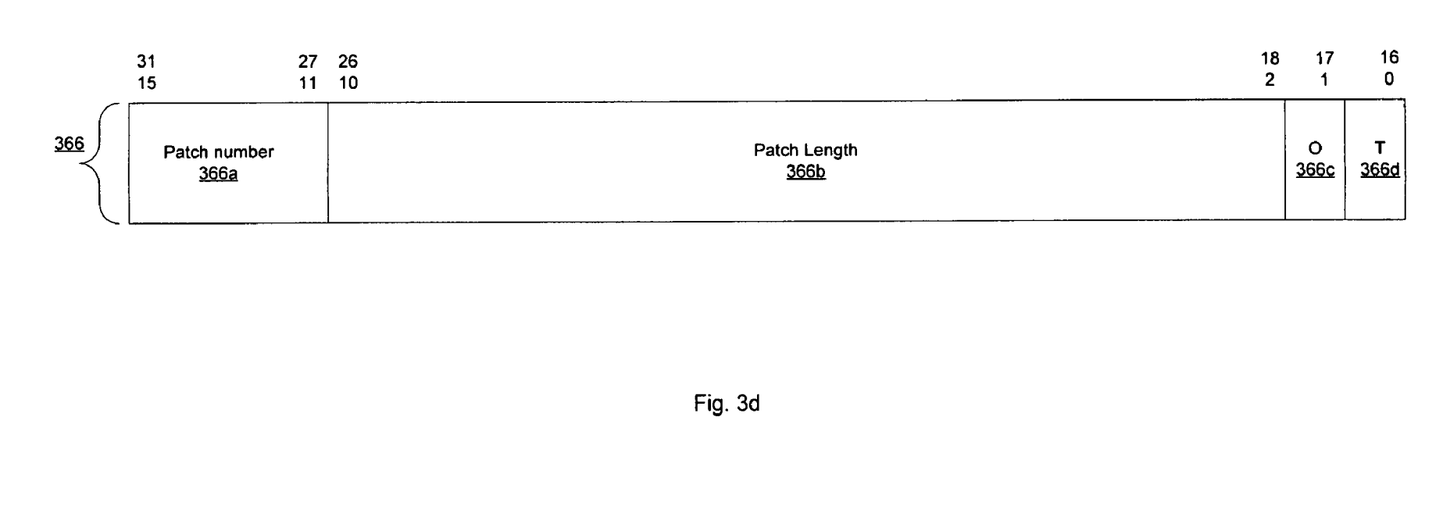
FIG. 3d is a diagram of an exemplary code patch descriptor within the code patch descriptor block, in accordance with an embodiment of the invention.

FIG. 3d is a diagram of an exemplary code patch descriptor within the code patch descriptor block, in accordance with an embodiment of the invention. Referring to FIG. 3d, there is shown a patch number field 366a, a patch length field 366b, an override bit O 366c, and an instruction type bit T 366d.

The patch number field 366a may contain a reference number for the code patches, where the reference number may correspond to a function in the self-boot code 219. For example, a code patch in the ICP block 310 that corresponds to a first initialization function in the self-boot code 219 may have a patch number of zero. Similarly, a code patch in the SCP block 320 that corresponds to a fourth service function in the self-boot code 219 may have a code patch number of three.

The patch length field 366b may contain a size of the corresponding code patch in words. A length of zero in the patch length field 366b may be a null function. The zero length code patch may be used to effectively delete the corresponding function in the self-boot code 219. For example, the code patch length may be zero, and the corresponding function in the self-boot code 219 may be indicated to be overridden. Accordingly, the corresponding function may be skipped and no patch code may be executed in place of the skipped corresponding function.

The override bit O 366c may indicate whether the corresponding function in the self-boot code 219 may be executed. For example, if the override bit O 366c is asserted, the corresponding function in the self-boot code 219 may be overridden, and hence not executed. If the override bit is deasserted, the corresponding function in the self-boot code 219 may be executed after executing the corresponding code patch. If the code patch length is zero and the override bit O 366c is asserted, then the net effect is as if the corresponding function in the self-boot code 219 is deleted.

The instruction type bit T 366d may indicate whether the code patch corresponding to the code patch descriptor is in a native processor machine language or a patch code instruction (PCI) format. For example, if the instruction type bit is a one, the corresponding function may be in the native processor machine language and therefore may be executed normally. If the instruction type bit T 366d is asserted, the corresponding code patch may be in the native processor machine language, for example, the MIPS machine language. If the instruction type bit T 366d is not asserted, the corresponding code patch may be in the PCI format. Instructions in the PCI format may have to be interpreted by the self-boot code 219. A code patch may be either in the native processor machine language or the PCI format. A code patch may not have both the native processor machine language instructions and the PCI format instructions.

Figure 4A:
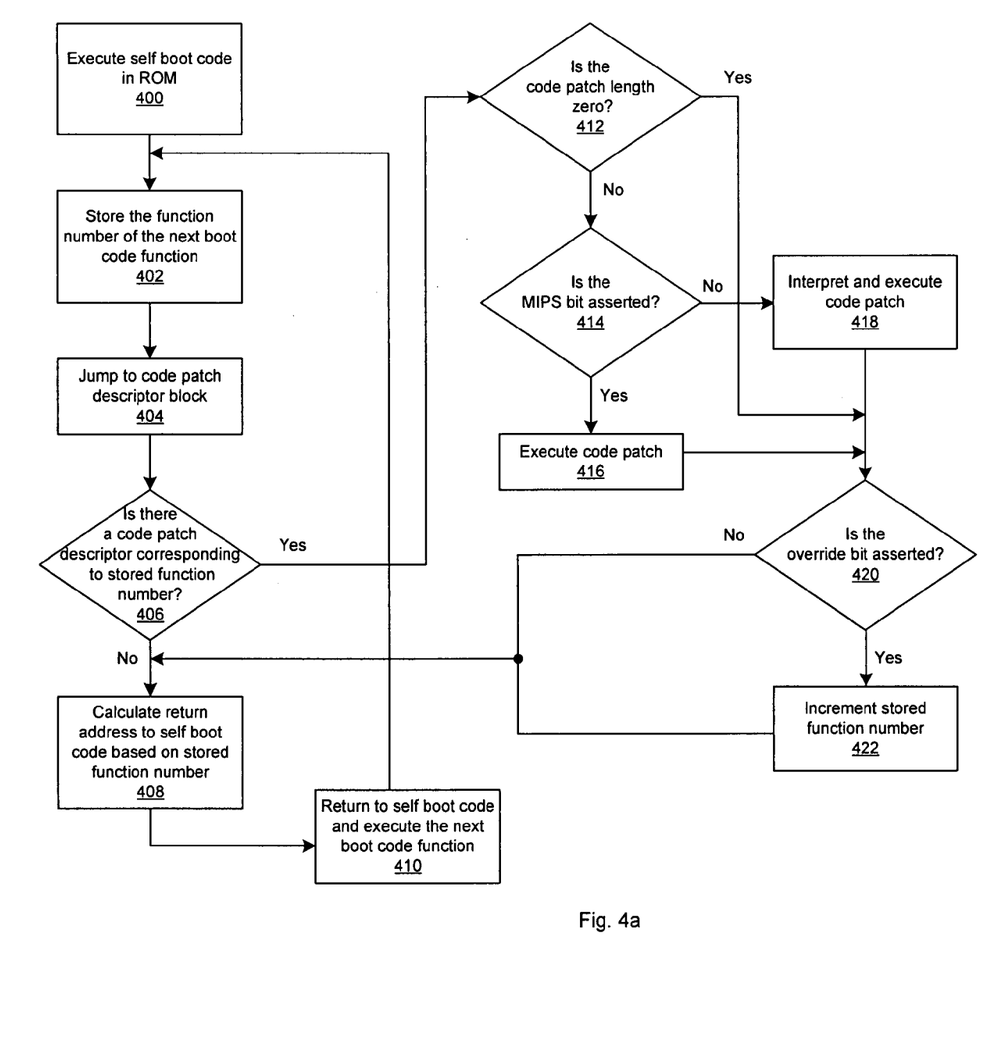
FIG. 4a is a flow chart illustrating exemplary steps for flow of self-boot code and code patch, in accordance with an embodiment of the invention.

FIG. 4a is a flow chart illustrating exemplary steps for flow of self-boot code and code patch, in accordance with an embodiment of the invention. Referring to FIG. 4a, in step 400, the processor 210 may start execution of the self-boot code 219, for example. In step 402, the first initialization function in the self-boot code 219 may need to be executed. This may comprise, for example, initializing various hardware registers in the NAC 109. Prior to executing the first initialization function, the processor 210 may store the function number of the first initialization function, for example, in a register in the processor 210. The function number for the first initialization function may be zero.

In step 404, the processor 210 may execute instructions to fetch information from the code patch descriptor block 365. The information may be fetched from the NVRAM 222 or from the RAM 214 where the information may have been copied. In step 406, the processor 210 may determine whether there is a corresponding code patch by examining the patch number in the patch number field 366a of each code patch descriptor. If there is no matching patch number, for example, zero in this case, found after the processor 210 searches through the number of code patch descriptors listed in the patch count field 363, the next step may be 408. Otherwise, the next step may be 412.

In step 408, the processor 210 may calculate the return address based on the stored function number. In this example, the return address may be the address of the first initialization function in the self-boot code 219. In step 410, the processor 210 may execute instructions from the first initialization function. In step 402, the address of the next function to be executed, for example, the second initialization function in this case, may be stored.

In step 412, the processor 210 may determine whether the code patch length of the code patch corresponding to the function in the self-boot code 219 may be zero. The code patch length may be read from the patch length field 366b of the corresponding code patch descriptor. If the code patch length is non-zero, the next step may be step 414. Otherwise, the next step may be step 420.

In step 414, the processor 210 may determine whether the instruction type bit T 366d is asserted. If this bit is asserted, the corresponding code patch may be in the native processor machine language and may not need to be interpreted, and the next step may be step 416. If this bit is not asserted, the corresponding code patch may be in PCI format and may need to be interpreted, and the next step may be step 418.

In step 416, the code patch that is in the native processor machine language may be executed. The next step may be step 420. In step 418, the code patch that is in PCI format may be interpreted and then executed. The processor 210 may use interpreter code that may be part of the self-boot code 219.

In step 420, the processor 210 may determine if the override bit O 366c is asserted. If this bit is asserted, the next step may be step 422. Otherwise, the next step may be step 408. In step 422, the processor may increment the stored function number by one. Since the return address to the self-boot code 219 may be calculated by using the stored function number, this may effectively skip the function in the self-boot code 219 that corresponds to the most recently executed code patch. The next step may be step 408.

By correctly setting the override bit O 366c, the code patch may be executed in place of the corresponding function in the self-boot code 219 or the code patch may be executed in addition to the corresponding function in the self-boot code 219. The corresponding function in the self-boot code 219 may also be deleted or only the corresponding function in the self-boot code 219 may be executed. For example, if the override bit O 366c is asserted and the code patch is a non-zero length code patch, the code patch may be executed while the corresponding function in the self-boot code 219 may be skipped. The steps executed may comprise the steps 400, 402, 404, 406, 412, 414, 416 or 418, 420, 422, 408, 410, and 402.

If the override bit O 366c is not asserted and the code patch is a not a zero length code patch, both the code patch and the corresponding function in the self-boot code 219 may be executed. The steps executed may comprise the steps 400, 402, 404, 406, 412, 414, 416 or 418, 420, 408, 410, and 402.

If the override bit O 366c is asserted and the code patch is a zero-length code patch, the corresponding function in the self-boot code 219 may be skipped while there and there may be no code patch to execute. Accordingly, the corresponding function in the self-boot code 219 effectively deleted. The steps executed may comprise the steps 400, 402, 404, 406, 412, 420, 422, 408, 410, and 402.

If there is no corresponding code patch to a function in the self-boot code 219, only the function in the self-boot code 219 may be executed. The steps executed may comprise the steps 400, 402, 404, 406, 408, 410, and 402. Similarly, if the override bit O 366c is not asserted and the code patch is a zero-length code patch, only the corresponding function in the self-boot code 219 may be executed. The steps executed may comprise the steps 400, 402, 404, 406, 412, 420, 408, 410, and 402.

Figure 4B:
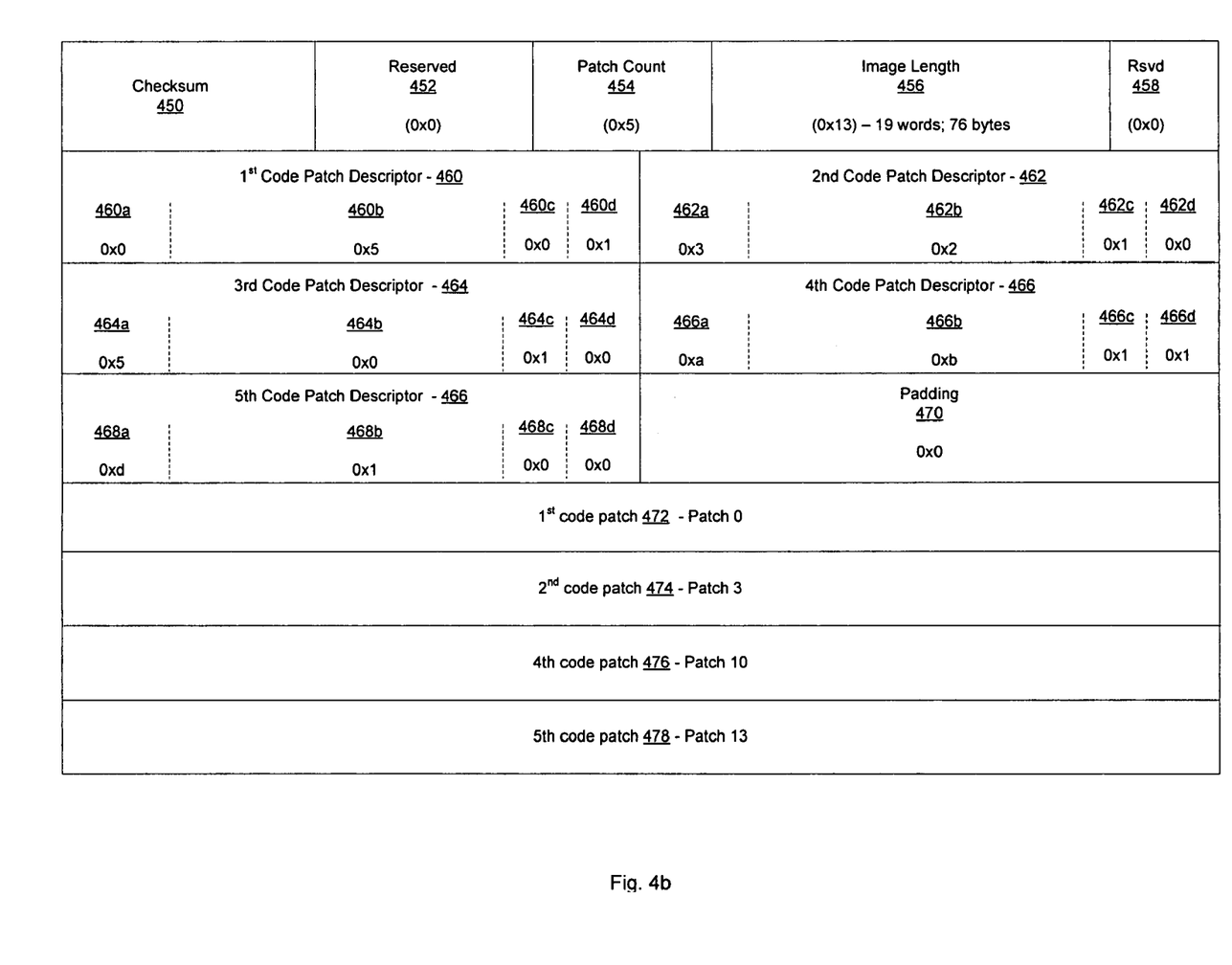
FIG. 4b is an exemplary diagram of the code patch block for five code patches, in accordance with an embodiment of the invention.

FIG. 4b is an exemplary diagram of the code patch block for five code patches, in accordance with an embodiment of the invention. Referring to FIG. 4b, there is shown an exemplary code patch block for five code patches. The code patch block may be an ICP code patch block or a SCP code patch block. The code patch block may comprise the checksum field 450, the reserved fields 452 and 458 that may be set to zeros, the patch count field 454 that may indicate that there are five code patches, and an image length block 456 that may indicate that the image size is 19 words. Additionally, the code patch block may have five code patch descriptors 460, 462, 464, 466, and 468. There may be a 16-bit pad 470 that may be filled with zeros. The 16-bit pad 470 may allow the code patch descriptors to end on a 32-bit word boundary. There may also be four code patch images 472, 474, 476, and 478. A fifth code patch image may not be present since one of the code patch descriptors may indicate a code patch size of zero.

The first code patch descriptor 460 may have a value of 0 in the patch number field 460a to indicate that the code patch corresponds to the first function of the ICP code patch block or the SCP code patch block. The patch length field 460b may hold a value of 5 to indicate that the code patch comprises 5 words of instructions. The override bit O 460c may not be asserted. Accordingly, the corresponding first function in the self-boot code 219 may be executed after execution of this code patch. The instruction type bit T 460d may be asserted to indicate that the code patch may be in native processor machine language, and accordingly, may not need to be interpreted.

The second code patch descriptor 462 may have a value of 3 in the patch number field 462a to indicate that the code patch corresponds to the fourth function of the ICP code patch block or the SCP code patch block. The patch length field 462b may hold a value of 2 to indicate that the code patch comprises 2 words of instructions. The override bit O 462c may be asserted. Accordingly, the corresponding fourth function in the self-boot code 219 may be skipped after execution of this code patch. The instruction type bit T 462d may not be asserted to indicate that the code patch may be in PCI format, and accordingly, may need to be interpreted.

The third code patch descriptor 464 may have a value of 5 in the patch number field 464a to indicate that the code patch corresponds to the sixth function of the ICP code patch block or the SCP code patch block. The patch length field 464b may hold a value of 0, for example, to indicate that the code patch comprises zero words of instructions. The override bit O 464c may be asserted. Accordingly, the corresponding sixth function in the self-boot code 219 may be skipped after execution of this code patch. The instruction type bit T 464d may be asserted. However, this bit may be meaningless in this case since there may not be a code patch that corresponds to this code patch descriptor. Accordingly, the sixth function in the self-boot code 219 may be effectively deleted.

The fourth code patch descriptor 466 may have a value of 10 in the patch number field 466a to indicate that the code patch corresponds to the eleventh function of the ICP code patch block or the SCP code patch block. The patch length field 466b may hold a value of 11 to indicate that the code patch comprises 11 words of instructions. The override bit O 466c may be asserted. Accordingly, the corresponding eleventh function in the self-boot code 219 may be skipped after execution of this code patch. The instruction type bit T 466d may be asserted to Indicate that the code patch may be in native processor machine language, and accordingly, may not need to be interpreted.

The fifth code patch descriptor 468 may have a value of 13 in the patch number field 466a to indicate that the code patch corresponds to the fourteenth function of the ICP code patch block or the SCP code patch block. The patch length field 466b may hold a value of 1 to indicate that the code patch comprises 1 word of instructions. The override bit O 466c may not be asserted. Accordingly, the corresponding fourteenth function in the self-boot code 219 may be executed after execution of this code patch. The instruction type bit T 466d may not be asserted to indicate that the code patch may be in PCI format, and accordingly, may need to be interpreted.

The first code patch 472 may correspond to the first code patch descriptor 460, and may also correspond to the first function of the ICP code patch block or the SCP code patch block in the self-boot code 219. The first code patch 472 may comprise five words of instruction in native processor machine language. The second code patch 474, may correspond to the second code patch descriptor 462, and also may correspond to the fourth function of the ICP code patch block or the SCP code patch block in the self-boot code 219. The second code patch 474 may have two words of instruction in PCI format. Since the size of the code patch that corresponds to the third code patch descriptor 464 may be zero, there may not be a corresponding code patch to the third code patch descriptor 464.

The third code patch 476 may correspond to the fourth code patch descriptor 466, and also may correspond to the eleventh function of the ICP code patch block or the SCP code patch block in the self-boot code 219. The third code patch 476 may have eleven words of instruction in native processor machine language. The fourth code patch 476, may correspond to the fifth code patch descriptor 468, and also may correspond to the fourteenth function of the ICP code patch block or the SCP code patch block in the self-boot code 219. The fourth code patch 474 may have one word of instruction in PCI format.

Figure 5:
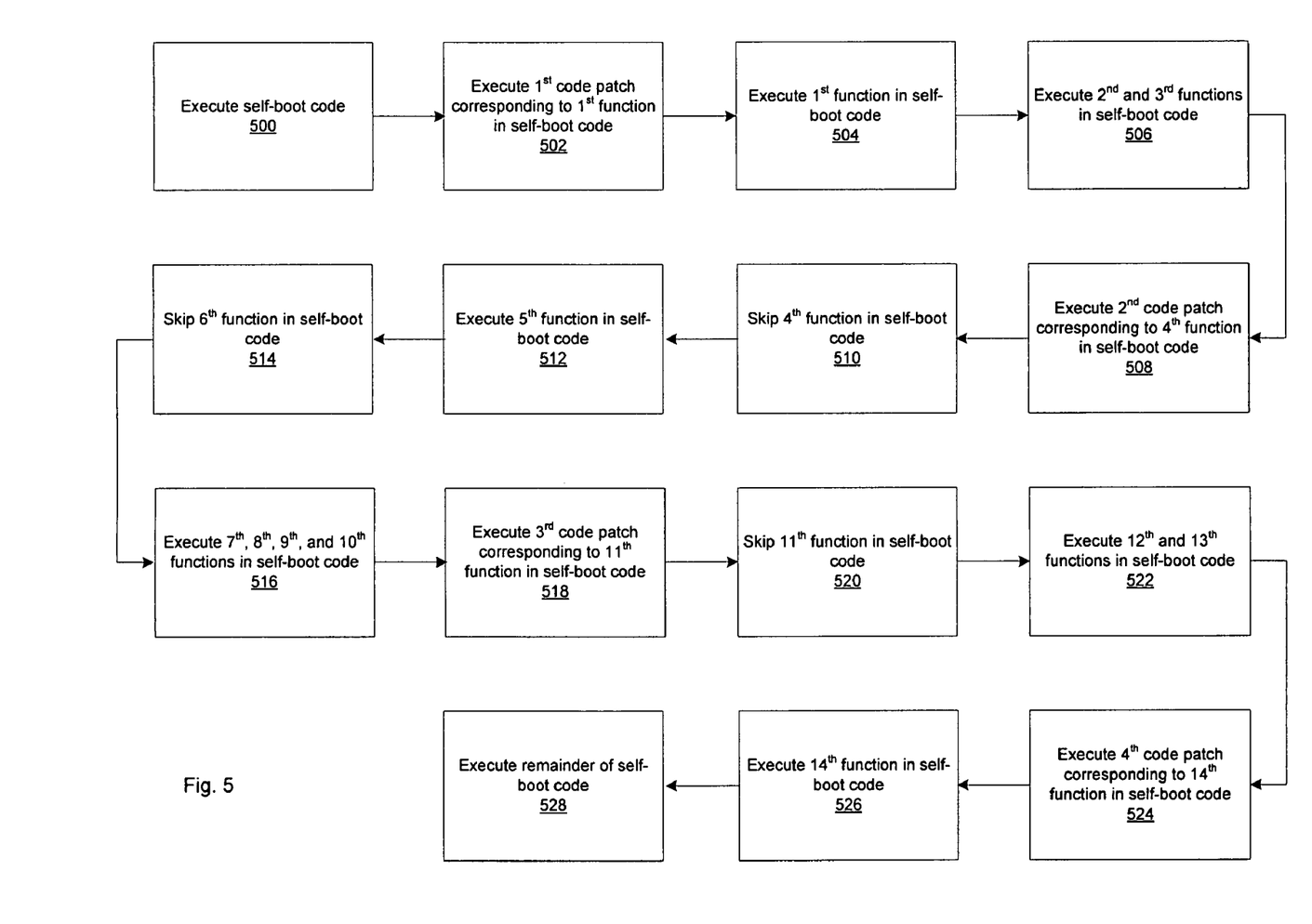
FIG. 5 is a flow chart illustrating exemplary steps for operation of self-boot code with the code patch block in FIG. 4b, in accordance with an embodiment of the invention.

FIG. 5 is a flow chart illustrating exemplary steps for operation of self-boot code with the code patch block in FIG. 4b, in accordance with an embodiment of the invention. Referring to FIG. 5, the steps 500 to 528 may describe execution of self-boot code 219 with respect to the code patch block described in FIG. 4b. The code patch block described in FIG. 4b may be an ICP code patch block to simplify description.

In step 500, the processor 210 may start to execute the self-boot code 219. In step 502, the processor 210 may execute the first code patch 472 corresponding to the first function in the self-boot code 219. In step 504, the processor 210 may execute the first function in the self-boot code 219. Since there may not be corresponding code patches to the second and third functions in the ICP code patch block, the processor 210 may execute the second and third functions in the self-boot code 219 in step 506.

In step 508, the processor 210 may execute the second code patch 474 corresponding to the fourth function in the self-boot code 219. In step 510, the processor 210 may skip the fourth function in the self-boot code 219 since the override bit O may have been asserted in the code patch descriptor 462 for the second code patch 474. Accordingly, the processor 210 may execute the fifth function in the self-boot code 219 in step 512.

In step 514, the processor 210 may skip the sixth function in the self-boot code 219 since the corresponding code patch descriptor 464 may indicate that the code patch has zero length and the override O is asserted. In step 516, the processor 210 may execute seventh, eighth, ninth, and tenth functions in the self-boot code 219. In step 518, the processor 210 may execute the third code patch 476 that may correspond to the eleventh function in the self-boot code 219. In step 520, the processor 210 may skip the eleventh function in the self-boot code 219 since the corresponding code patch descriptor 466 may indicate that the override bit O is asserted.

In step 522, the processor 210 may execute twelfth and thirteenth functions in the self-boot code 219. In step 524, the processor 210 may execute the fourth code patch 478 that may correspond to the fourteenth function in the self-boot code 219. In step 526, the processor 210 may execute the fourteenth function in the self-boot code 219. In step 528, the processor 210 may continue to execute the remaining instructions in the self-boot code 219.

Another embodiment of the invention may provide a machine-readable storage, having stored thereon, a computer program having at least one code section executable by a machine, thereby causing the machine to perform the steps as described above for modifying operation of ROM based boot behavior of a network device.

In accordance with an embodiment of the invention, aspects of an exemplary system may comprise the processor 210 that modifies during a bootup, a bootup sequence for self-boot code 219 resident in the ROM 216 within the NAC 109. The modifying may occur during booting of the NAC 109 by executing code patches 223 in memory external to the NAC 109. The processor 210 within the NAC 109 may execute at least a portion of the code patch 223 resident in the memory external to the NAC 109 during the bootup. The processor 210 may verify a presence of valid code patches 223 in the external memory, for example, the NVRAM 222. The code patches 223 may comprise initialization code patch (ICP) and/or service code patch (SCP).

The processor 210 may initialize the ICP and the SCP during booting of the NAC 109. During the booting of the NAC 109, the processor 210 may execute the ICP code patches before executing the SCP code patches. When a code patch is executed by the processor 210, whether ICP or SCP, the code patch may be executed in addition to a corresponding function in the self-boot code 219 in the ROM 216. Alternatively, the code patch may be executed in place of the corresponding function in the self-boot code 219. If the code patch has a length zero, then the configuration of the code patches 223 in the header blocks 360 may indicate that the corresponding function in the self-boot code 219 may be effectively deleted. This may occur because the corresponding function in the self-boot code 219 may be skipped, but there may not be any instructions in the code patch to execute.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present inven-

What is claimed is:

1. A method for processing information, the method comprising:
   determining a value of a one or more specified bits that indicate whether a code patch in memory external to a network adapter chip should be executed or skipped; and
   based on said determination, modifying a bootup sequence for boot code resident in a ROM within said network adapter chip during booting of said network adapter chip using said code patch resident in said memory external to said network adapter chip.

2. The method according to claim 1, comprising executing at least a portion of said code patch resident in said memory external to said network adapter chip during said booting of said network adapter chip.

3. The method according to claim 1, comprising verifying presence of valid code patch resident in said memory external to said network adapter chip.

4. The method according to claim 1, wherein said code patch comprises at least one of the following: initialization code patch and service code patch.

5. The method according to claim 4, comprising initializing said initialization code patch during said booting of said network adapter chip.

6. The method according to claim 4, comprising initializing said service code patch during said booting of said network adapter chip.

7. The method according to claim 6, comprising executing at least a portion of said initialization code patch during said booting of said network adapter chip prior to executing at least a portion of said service code patch.

8. The method according to claim 4, comprising executing at least a portion of said initialization code patch in addition to executing corresponding code in said boot code in said ROM.

9. The method according to claim 4, comprising executing at least a portion of said initialization code patch in place of executing corresponding code in said boot code in said ROM.

10. The method according to claim 4, comprising skipping execution of at least a portion of said initialization code patch and corresponding code in said boot code in said ROM during said booting of said network adapter chip.

11. The method according to claim 4, comprising executing at least a portion of said service code patch in addition to executing corresponding code in said boot code in said ROM.

12. The method according to claim 4, comprising executing at least a portion of said service code patch in place of executing corresponding code in said boot code in said ROM.

13. The method according to claim 4, comprising skipping execution of at least a portion of said service code patch and corresponding code in said boot code in said ROM during said booting of said network adapter chip.

14. The method according to claim 1, wherein said one or more specified bits comprises an override bit.

15. The method according to claim 14, comprising executing said code patch when said one or more specified bits comprising said override bit is asserted.

16. The method according to claim 14, comprising skipping said code patch when said one or more specified bits comprising said override bit is deasserted.

17. A system for processing information, the system comprising:
   one or more circuits within a network adapter chip, said one or more circuits enable determining a value of a one or more specified bits that indicate whether a code patch in memory external to said network adapter chip should be executed or skipped; and
   said one or more circuits enable modification of a bootup sequence for boot code resident in a ROM within said network adapter chip during booting of said network adapter chip using said code patch resident in said memory external to said network adapter chip.

18. The system according to claim 17, wherein said one or more circuits enable execution of at least a portion of said code patch resident in said memory external to said network adapter chip during said booting of said network adapter chip.

19. The system according to claim 17, wherein said one or more circuits enable verification of presence of valid code patch resident in said memory external to said network adapter chip.

20. The system according to claim 17, wherein said code patch comprises at least one of the following: initialization code patch and service code patch.

21. The system according to claim 20, wherein said one or more circuits enable initialization of said initialization code patch during said booting of said network adapter chip.

22. The system according to claim 20, wherein said one or more circuits enable initialization of said service code patch during said booting of said network adapter chip.

23. The system according to claim 22, wherein said one or more circuits enable execution of at least a portion of said initialization code patch during said booting of said network adapter chip prior to executing at least a portion of said service code patch.

24. The system according to claim 20, wherein said one or more circuits enable execution of at least a portion of said initialization code patch in addition to executing corresponding code in said boot code in said ROM.

25. The system according to claim 20, wherein said one or more circuits enable execution of at least a portion of said initialization code patch in place of executing corresponding code in said boot code in said ROM.

26. The system according to claim 20, wherein said one or more circuits enable skipping of execution of at least a portion of said initialization code patch and corresponding code in said boot code in said ROM during said booting of said network adapter chip.

27. The system according to claim 20, wherein said one or more circuits enable execution of at least a portion of said service code patch in addition to executing corresponding code in said boot code in said ROM.

28. The system according to claim 20, wherein said one or more circuits enable execution of at least a portion of said service code patch in place of executing corresponding code in said boot code in said ROM.

29. The system according to claim 20, wherein said one or more circuits enable skipping of execution of at least a portion of said service code patch and corresponding code in said boot code in said ROM during said booting of said network adapter chip.

30. The system according to claim 26, wherein said one or more specified bits comprises an override bit.

31. The system according to claim 30, wherein said code patch is executed when said one or more specified bits comprising said override bit is asserted.

32. The system according to claim 30, wherein execution of said code patch is skipped when said one or more specified bits comprising said override bit is deasserted.

* * * * *